United States Patent Office 3,281,457
Patented Oct. 25, 1966

3,281,457
PROCESS FOR THE PRODUCTION OF VINYL
ESTERS BY THE OXIDATION OF ETHYLENE
Rene Achard, Gilbert Bo, Reginald David, and Jean
Estienne, all of Lyon, France, assignors to Rhone-
Poulenc S.A., Paris, France, a French body corporate
No Drawing. Filed Aug. 2, 1963, Ser. No. 299,475
Claims priority, application France, Aug. 6, 1962, 906,203;
Aug. 14, 1962, 906,918; Nov. 19, 1962, 915,859; Nov.
22, 1962, 916,310
9 Claims. (Cl. 260—497)

The present invention concerns a process for the preparation of vinyl esters by the action of ethylene on an aliphatic carboxylic acid in the presence of a noble metal chloride and of a benzoquinone.

Moiseev, Vargaftik and Syrkin—Doklady Acad. Nauk., vol. 133, No. 2, p. 377 (1960) have described a reaction between palladium salts and olefines in hydroxyl-containing solvents, more especially in the presence of hydrogen acceptors such as benzoquinone. For example, they reacted ethylene at normal pressure with a solution of 0.001 mol. of palladium chloride ($PdCl_2$) and 0.1 mol. of sodium acetate in 125 cc. of glacial acetic acid containing 0.25 mol. of benzoquinone. After 63 hours at 18° C., they obtained 0.038 mol. of vinyl acetate, the benzoquinone being partially reduced to quinhydrone. The authors describe the reaction as follows:

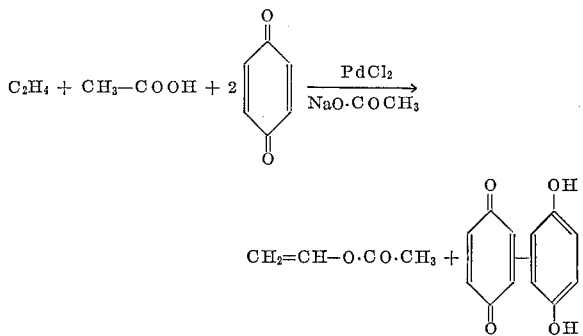

In this experiment, 1 mol. of palladium chloride was sufficient to prepare 38 mol. of vinyl acetate, but 0.25 mol. of benzoquinone was required to produce 0.038 mol. of vinyl acetate, a yield of only 15% on the benzoquinone. If this reaction is to be converted into an industrial process for the preparation of vinyl acetate, it is essential to be able to regenerate the benzoquinone, which is a costly substance, by a simple and cheap process, with minimum losses. But for re-oxidizing quinhydrone to benzoquinone, the only processes known involve working in the aqueous phase using chemical oxidizing agents, and consequently require complicated and laborious manipulations.

It has now been found that, by reacting ethylene with a solution of a halide of a noble metal, more especially palladium chloride, in acetic acid containing p-benzoquinone and an alkali metal acetate, and operating under a superatmospheric pressure and at a temperature above the ambient temperature, vinyl acetate is obtained in a yield much higher than that indicated above. Moreover, under these conditions, p-benzoquinone is reduced to hydroquinone, which is soluble in the medium in which the operation is carried out, and which is much more readily re-oxidizable to benzoquinone than quinhydrone.

In the process described by Moiseev, the reduction of benzoquinone stops at the quinhydrone stage, and therefore 1 mol. of benzoquinone can theoretically give only 0.5 mol. of vinyl acetate and in fact has given only 0.15 mol. As against this, it is possible by the present process to attain yields of 93–94% on the benzoquinone, i.e., close to 1 mol. of vinyl acetate per mol. of benzoquinone and therefore more than six times as much as in the earlier process. Moreover, these yields are attained in less than 2 hours, against 63 hours in the earlier process.

It is already know to oxidize hydroquinone to benzoquinone in solution in water or organic solvents by means of air in the presence of various catalysts. These oxidations can give good yields when the operation is carried out on pure hydroquinone solutions, but applicants have found that when hydroquinone solutions emanating from a vinylating operation and containing chlorine and sodium ions are used (from the reduction of palladium dichloride to palladium and from the sodium acetate), the usual catalysts, such as platinum, ruthenium, etc., give only a slow and incomplete reaction, sometimes accompanied by the formation of secondary products which coat and poison the catalyst so that it can not be re-used as such for a new vinylating reaction.

With the known processes, it would therefore be necessary to isolate the hydroquinone from the medium before it could be subjected, in the pure state, to a re-oxidation, and also the oxidations, which are very slow with the usual catalysts, would necessitate considerable immobilization of equipment.

It has now been found, and this forms another feature of the present invention, that by using rhodium as oxidation catalyst it is possible by means of oxygen or gas containing it, such as air, to oxidize hydroquinone to benzoquinone in a substantially quantitative yield and in very short times in a fatty acid medium containing chlorine and sodium ions, i.e., at the end of the vinylation; thus this process can be applied to the reaction medium which has merely been freed from the vinyl ester formed by distillation and from the palladium catalyst by filtration.

Having regard to the fact that rhodium is allied to palladium and platinum in the Periodic System, this result is surprising. Rhodium is known mainly as a hydrogenation catalyst and does not appear to have been used in oxidations under conditions approaching those of the present process, otherwise than as a catalyst for the complete combustion of formic acid to give carbon dioxide.

It has further been found that the vinylating process of the invention may also be carried out with other aliphatic carboxylic acids, and is therefore applicable to the preparation of various vinyl esters, in which case the alkali metal acetate is replaced by an alkali metal salt of the acid employed. It has also been found that p-benzoquinone is not the only quinone that can be used, and that regardless of the aliphatic acid employed, p-quinones generally, especially alkylated homologues of p-benzoquinone, halogeno-p-benzoquinones and alkyl-halogeno-benzoquinones, may be employed. In the process these quinones are themselves reduced to the diphenol stage, and can readily be regenerated by catalytic re-oxidation as described above.

As an alkanoic acid other than acetic acid, there may be employed, for example, propionic acid, and as salts the anhydrous sodium and potassium salts.

As quinones other than p-benzoquinone, there may be employed its alkylated homologues, more especially those having on the nucleus one or two alkyl radicals, such as methyl and ethyl, for example 2-methyl-p-benzoquinone. Likewise, mono- and dihalogeno-p-benzoquinones, and more especially the chloro- and bromo-p-benzoquinones may be employed, for example monochloro-p-benzoquinone, 2,5-dichloro-p-benzoquinone and monobromo-p-benzoquinone.

The vinylating process of the invention may be carried out at a temperature of 30° to 100° C., preferably 50° to 80° C., and under an ethylene pressure of 10 to 100 atmospheres, depending upon the temperature adopted for the reaction. Although these lower and upper limits are not imperative, it is preferable not to go below 10 atmospheres, while substantially nothing is gained in operating above 100 atmospheres.

The relative proportions of the various components of the medium, i.e. aliphatic acid, quinone, palladium chloride and alkali metal salt corresponding to the acid employed, may vary within wide limits. There are advantageously employed molecular ratios of quinone to palladium chloride from 50 to 250 and concentrations from 0.1 to 4 mol. of quinone to 1000 cc. of alkanoic acid and about 2 mol. of alkali metal alkanoate per mol. of palladium chloride.

In practice, the alkanoic acid, the quinone, the palladium chloride and the alkali metal salt are introduced into a pressure-resistant apparatus and, after purging of the atmosphere successively with nitrogen and ethylene, ethylene is introduced under pressure. The temperature is then raised to the desired value, the mixture is stirred and the pressure is periodically restored to the original value by further charges of ethylene. When the absorption of ethylene has stopped, the product is distilled under a medium vacuum by heating to the boiling point of the alkanoic acid. The vinyl ester which passes over with a quantity of the alkanoic acid is thereafter isolated by rectification. The residue from the first distillation is filtered to separate the palladium formed by reduction of palladium chloride, and the filtrate is treated to regenerate the quinone, which has been converted into the corresponding diphenol in the course of the operation.

The metallic palladium separated as previously stated is also recovered and is reconverted into palladium chloride.

It is necessary to carry out the reaction in the absence of water. Therefore, care must be taken to employ well dehydrated starting materials and where necessary, before the introduction of the ethylene, to complete the dehydration of the medium by entrainment, by distilling off a small quantity of acid, or by any other means giving the same result.

In order to regenerate the quinone, there is first added to the filtered residual solution 0.25–5%, preferably 1–2%, of rhodium, calculated on the weight of diphenol to be re-oxidized, preferably in a dispersed form on carbon black. The mixture is thereafter subjected to the action of oxygen, either pure or mixed with gases which are inert under the operating conditions, simply by bubbling the oxygen through at atmospheric pressure or in an autoclave under pressure, the temperature being between 20° and 100° C., and preferably between 50° and 80° C. The poorer the gas is in oxygen, the more advantageous is it to increase the pressure. In practice, good results are obtained by operating with air under a pressure of 10 atmospheres or with pure oxygen under a pressure of 5 atmospheres. Depending upon the temperature and the oxygen concentration, the regeneration of the quinone may require between 10 minutes and 2 hours. When the oxidation is complete, the catalyst is filtered off, the water formed is eliminated by any suitable means, for example by distillation, and the quinone solution is ready for a further vinylating operation.

The following examples illustrate the invention.

*Example 1*

Into a four-liter autoclave provided with a stirring and heating system, are introduced:

Palladium di-chloride _____ 0.890 g.=0.005 mol.
Anhydrous sodium acetate _____ 1.025 g.=0.0125 mol.
p-Benzoquinone _____ 54 g.=0.5 mol.
Acetic acid _____ 2638 g.=2500 cc.

The air is eliminated from the autoclave by means of a current of nitrogen and then a current of ethylene, whereafter the vinylation is effected with stirring and heating at 80° C., an ethylene pressure of 35 atmospheres being maintained. The absorption is complete at the end of 1½ hours. The temperature is then reduced to 10° C., the pressure is released, the contents of the autoclave are transferred into a distillation apparatus, the autoclave is flushed with 300 g. of acetic acid, and the whole is thereafter distilled under a moderate vacuum (50 mm. Hg), so that the temperature does not exceed 50° C. At 42–46° C., vinyl acetate containing acetic acid passes over and there remains a residue of 2467 g. consisting of an acetic acid solution of hydroquinone free from benzoquinone but containing sodium chloride and metallic palladium. By rectification 39.75 g. of vinyl acetate is separated from the distillate which represents a yield of 92.5% calculated on the benzoquinone. The acetic acid solution of hydroquinone is freed from palladium by filtration and the palladium is washed with a little acetic acid, and the filtrate and the washing (2552 g. in all) are reintroduced into the apparatus.

To this filtrate, which contains 55 g. of hydroquinone, are added 20 g. of 4.8% rhodium deposited on carbon black, i.e. 0.960 g. of metallic Rh. The mixture is heated to 50° C. and oxygen is introduced under a pressure of 5 atmospheres. The pressure is periodically brought back to 5 atmospheres by further introduction of oxygen. The absorption ceases after 2 hours. After cooling, the contents of the apparatus are transferred and the apparatus is flushed with 200 g. of acetic acid, and the catalyst is filtered and rinsed with 75 cc. of acetic acid. A filtrate weighing 2801 g. is obtained, which according to titration contains 53.6 g. of benzoquinone, i.e. a yield of 99.3% on the benzoquinone originally introduced. To the solution thus obtained are added 200 cc. of benzene, and the mixture is distilled under an absolute pressure of 50 mm. Hg at the boiling point of the acetic acid, so as to entrain azeotropically the water which has formed in the oxidizing reaction.

After this distillation, there remain 2422 g. of solution, which is used for a second vinylation after the addition of 0.005 mol. of palladium di-chloride, 0.01 mol. of sodium acetate and further fresh acetic acid so as to restore the concentrations existing in the first vinylation.

Five vinylation and re-oxidation operations are thus successively performed. The yields of the vinylations and the re-oxidations, expressed respectively in mols. of vinyl acetate and in mols. of benzoquinone per 100 mol. of hydroquinone employed, in the opration are indicated in the following table:

| Run | Vinylation | Re-oxidation |
| --- | --- | --- |
| 1 | 92.5 | 99.3 |
| 2 | 93.2 | 98.9 |
| 3 | 92.3 | 98.3 |
| 4 | 93.6 | 98.85 |
| 5 | 93.7 | 98.2 |

*Example 2*

By proceeding as set forth in Example 1, but using monochloro-p-benzoquinone instead of benzoquinone, there is obtained a yield of 94% in the vinylation. The re-oxidation of the chlorodiphenol by means of pure oxygen under 5 atmospheres at 80° C. requires 25 minutes, and the yield is 99.1%.

*Example 3*

By proceeding as in Example 1 for the vinylation, but with monomethyl-p-benzoquinone instead of p-benzoquinone, there is obtained a yield of 97.5% in the vinylation. The re-oxidation carried out as in Example 2 requires 10 minutes and the yield is 97.2%.

Example 4

In this example, rhodium is compared with other oxidation catalysts. The tests were carried out on a residual vinylation solution containing:

| | |
|---|---:|
| Acetic acid, cc. | 133 |
| Hydroquinone, g. | 4 |
| NaCl, g. | 0.058 |

The oxidations were carried out at a temperature of 80° C. and under an oxygen pressure of 5 atmospheres, with the following catalysts:

Rhodium in a concentration of 5% on carbon black;
Platinum in a concentration of 5% on carbon black;
Palladium in a concentration of 10% on carbon black.

The catalyst weights (metal+carbon black), the durations of the reaction, the weights in g. of titrated quinone and the yields obtained are given in the following table:

| | Weight of catalyst, g. | Duration of the oxidation | Weight of quinone obtained, g. | Yield percent |
|---|---|---|---|---|
| Rh | 1.600 | 40 min | 3.91 | 99.5 |
| Pt | 1.600 | 4 h | 3.52 | 89.7 |
| Pd | 0.800 | 6 h | 2.16 | 55.1 |

We claim:
1. Process for the production of vinyl esters of unsubstituted lower mono-alkanoic acids, which comprises reacting ethylene with an unsubstituted lower mono-alkanoic acid in the liquid phase in the presence of a p-quinone, palladium dichloride as catalyst and an alkali metal salt of the aliphatic acid, under substantially anhydrous conditions and under a superatmospheric pressure and at a temperature of 30°–100° C., separating the vinyl ester formed and the catalyst, re-oxidizing the di-phenol produced to the p-quinone by contact with gaseous oxygen at 20°–100° C., in the presence of 0.25–5% by weight of rhodium as a catalyst while said di-phenol is still in the residual liquid composition, and using the so regenerated p-quinone in a further reaction of ethylene with an unsubstituted lower monoalkanoic acid.

2. Process according to claim 1, wherein the lower monoalkanoic acid is acetic acid.

3. Process according to claim 1, wherein the lower monoalkanoic acid is propionic acid.

4. Process according to claim 1, wherein the p-quinone is selected from the group consisting of p-benzoquinone, alkyl-substituted p-benzoquinones, halogen-substituted p-benzoquinones and alkyl and halogen-substituted p-benzoquinones.

5. Process according to claim 1, wherein the vinylation reaction is effected at 50°–80° C. under a pressure of at least 10 atmospheres.

6. Process according to claim 1, wherein the rhodium is in a dispersed form deposited on carbon black.

7. Process according to claim 1, wherein the di-phenol is re-oxidized to the p-quinone at a temperature of 50°–80° C. under superatmospheric pressure.

8. Process for the production of vinyl acetate, which comprises reacting ethylene with acetic acid in the liquid phase in the presence of a p-quinone selected from the group consisting of p-benzoquinone, alkyl-substituted p-benzoquinones, halogen-substituted p-benzoquinones, and alkyl and halogen-substituted p-benzoquinones, palladium dichloride as catalyst, and an alkali metal acetate, under substantially anhydrous conditions and under a pressure of at least 10 atmospheres and at a temperature of 50°–80° C., separating the vinyl acetate formed and the catalyst, re-oxidizing the di-phenol produced to the p-quinone by contact with gaseous oxygen at a temperature of 50°–80° C. under superatmospheric pressure in the presence as a catalyst of rhodium in a dispersed form deposited on carbon black while the di-phenol is still in the residual liquid composition, and using the so regenerated p-quinone in a further reaction of ethylene with acetic acid.

9. Process for the production of vinyl propionate, which comprises reacting ethylene with propionic acid in the liquid phase in the presence of a p-quinone selected from the group consisting of p-benzoquinone, alkyl-substituted p - benzoquinones, halogen-substituted p - benzoquinones and alkyl and halogen-substituted p-benzoquinones, palladium dichloride as catalyst, and an alkali metal propionate, under substantially anhydrous conditions and under a pressure of at least 10 atmospheres and at a temperature of 50°–80° C., separating the vinyl propionate formed and the catalyst, re-oxidizing the di-phenol produced to the p-quinone by contact with gaseous oxygen at a temperature of 50°–80° C. under superatmospheric pressure in the presence as a catalyst of rhodium in a dispersed form deposited on carbon black while the di-phenol is still in the residual liquid composition, and using the so regenerated p-quinone in a further reaction of ethylene with propionic acid.

References Cited by the Examiner
FOREIGN PATENTS

| | | |
|---|---|---|
| 608,610 | 3/1962 | Belgium. |
| 137,511 | 4/1960 | U.S.S.R. |
| 145,569 | 5/1962 | U.S.S.R. |

OTHER REFERENCES

Moiseev II, Doklady Akademii Nauk S.S.S.R., vol. 133, pp. 377–380 (July 1960).

Smidt, Angew. Chim., vol. 71, pp. 176–182 (1959).

LORRAINE A. WEINBERGER, *Primary Examiner.*

LEON ZITVER, *Examiner.*

D. P. CLARKE, V. GARNER, *Assistant Examiners.*